United States Patent
Hoffeld et al.

(10) Patent No.: US 6,840,040 B1
(45) Date of Patent: Jan. 11, 2005

(54) HYDRODYNAMIC COUPLING

(75) Inventors: Harald Hoffeld, Crailsheim (DE); Günther Schüttler, Wallhausen-Michelbach (DE)

(73) Assignee: Voith Tubro GmbH & Co. KG, Heidneheim (DE)

( * ) Notice: Subject to any disclaimer, the term of this patent is extended or adjusted under 35 U.S.C. 154(b) by 0 days.

(21) Appl. No.: 09/600,941

(22) PCT Filed: Jan. 21, 1999

(86) PCT No.: PCT/EP99/00373
§ 371 (c)(1),
(2), (4) Date: Sep. 13, 2000

(87) PCT Pub. No.: WO99/37934
PCT Pub. Date: Jul. 29, 1999

(30) Foreign Application Priority Data

Jan. 26, 1998 (DE) ......................... 198 02 524

(51) Int. Cl.[7] ............................................. F16D 33/00
(52) U.S. Cl. ......................................... 60/336; 60/366
(58) Field of Search ........................... 60/336, 357, 366

(56) References Cited

U.S. PATENT DOCUMENTS

| | | | | |
|---|---|---|---|---|
| 3,377,957 A | * | 4/1968 | Bilton ......................... | 60/336 |
| 3,478,516 A | | 11/1969 | Bonsch et al. ................ | 60/54 |
| 3,782,514 A | * | 1/1974 | Mueller ....................... | 60/366 |
| 4,073,139 A | | 2/1978 | Armasow et al. ............. | 60/357 |
| 5,778,668 A | | 7/1998 | Adleff et al. ................. | 60/339 |
| 5,819,895 A | | 10/1998 | Tuschen ....................... | 192/3.3 |
| 6,101,810 A | | 8/2000 | Adleff et al. .................. | 60/337 |

FOREIGN PATENT DOCUMENTS

| | | |
|---|---|---|
| DE | 977 506 | 9/1966 |
| DE | 1 242 419 | 6/1967 |
| DE | 1 600 062 | 1/1970 |
| DE | 1 750 865 | 5/1971 |
| DE | 92 02 578.1 | 5/1992 |
| DE | 195 22 753 | 1/1997 |
| DE | 295 21 541 | 9/1997 |
| DE | 196 14 589 | 10/1997 |
| EP | 0 427 589 | 5/1991 |
| GB | 1146840 | 3/1969 |

* cited by examiner

Primary Examiner—F. Daniel Lopez
(74) Attorney, Agent, or Firm—Baker & Daniels

(57) ABSTRACT

The hydrodynamic coupling includes a pump blade wheel and a turbine blade wheel together forming at least one toroidal operating space capable of receiving an operating medium. The housing at least partially in an axial direction contains the pump blade wheel and forms an intermediate space at least with the pump blade wheel. The pump blade wheel defines at least one connection channel between the toroidal operating space and the intermediate space, the connection channel having at least one directional component that is oriented essentially tangentially to the contour of the circulation of the operating medium in the operating state between the pump blade wheel and the turbine blade wheel. The connection channel provides a partial flow of operating medium in the operating space, providing a rinsing effect for deposits collected on the housing in the intermediate space.

13 Claims, 2 Drawing Sheets

Fig.2a1
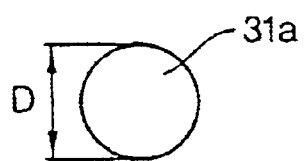
Fig.2a2
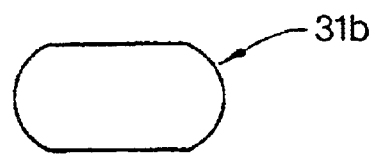
Fig.2b
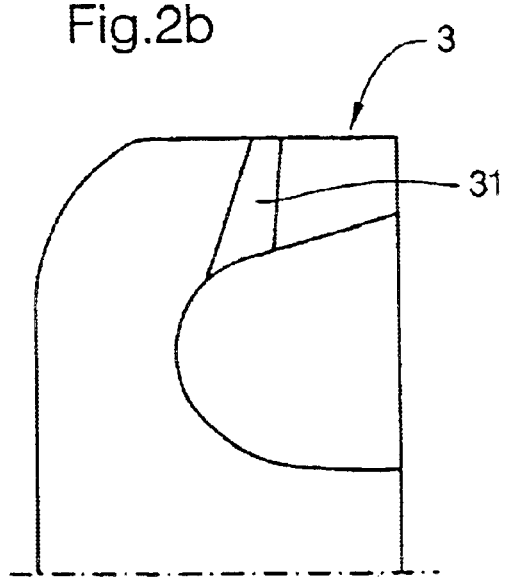

HYDRODYNAMIC COUPLING

BACKGROUND OF THE INVENTION

1. Field of the Invention

The invention relates to a hydrodynamic coupling.

2. Description of the Related Art

Hydrodynamic couplings are known for many application cases in many embodiments. An application case of a hydrodynamic coupling in a turbo compound system is disclosed in the reference DE 92 02 578.1. This coupling is connected to the lubricating oil circulation of the internal combustion engine and uses this oil as an operating medium and coolant. From this document it is known that when using motor oil as an operating medium in hydrodynamic couplings, complications can result by impurities in the oil settling on the inside of the circumferential wall of the coupling, which can lead to a block of the coupling and to a loss of its capacity to offset the torque and rotational speed fluctuations. Since the entire coupling rotates, it acts like a centrifugal oil filter. Pump blades and turbine blades of the coupling are manufactured with a high form precision and surface quality, so that between the pump wheel and the turbine wheel, a circulatory flow finds optimal flow-through ratios and thus leads to a high degree of efficiency of the coupling. Because of the design of the blade mounting and the flow circulating between the turbine wheel and pump wheel, the danger of a deposition of solids on the blade mounting itself is generally negligible. Problems are caused by the condition, however, when the motor oil used as an operating medium leaves the operating chamber formed from the blades and thus no longer is found in the circular and rinsing flow between the blades, but instead is only exposed to the centrifugal force generated by the rotation of the coupling. Impurities in the oil are then centrifuged on account of their higher specific gravity, against the circumferential wall of the coupling where a danger of deposition certainly then occurs, when the inside of the circumferential has unevenness in the form of projections, recesses or edges or an insufficient surface quality. In case the primary side of the coupling gets caught on the secondary side due to deposits, then a rigid connection between the primary side and the secondary side results from this, such that during rotary oscillations of the crankshaft of the internal combustion engine, a damage can result either to the coupling or to the drive parts operating together with it. Furthermore, solid deposits in the coupling can also harm the flow in the coupling, which can lead to an increase of the operating temperature and as a result to a damage of the coupling. Another essential problem is the unbalanced mass generated by the deposit, which causes bending vibrations. If the primary side of the coupling touches the secondary side due to deposits, then an additional transmission of torque results from this. In order to avoid this disadvantageous effect, it is proposed in this document that hydrodynamic couplings contain a pump wheel and a turbine wheel, which are connected with a shaft and where the individual blade wheels each form a half-toroidal ring that face each other, have a blade holder and thus form a toroid-shaped operating chamber, and where one of these blade wheels has a housing that is affixed to its radial outer edge, extends radially to the inside and surrounds the rear side of the other wheel, in order to provide the inner side of the housing that faces the rear side of the other wheel with a coating that is friction-reducing and/or inhibitive to solid depositions. This coating generates a very smooth surface, which however, only minimizes the possibility for the depositions, but does not eliminate them. Furthermore, the application of a coating means an increased expense and damages in the coating reduce the success and create additional deposit surfaces.

The purpose of the invention is therefore to further develop a hydrodynamic coupling for use in drive systems which have an operating medium flowing through them in such a way that the problem of the depositions is ruled out to the maximum possible extent. The solution according to the invention should in the process be characterized by as small as possible expense for construction and manufacturing technology.

The solution according to the invention is characterized by the characteristics of claim 1. Advantageous embodiments are described in the subordinate claims.

BRIEF SUMMARY OF THE INVENTION

The hydrodynamic coupling, which contains a pump blade wheel and a turbine blade wheel, each forming at least one toroidal operating space with each other and can be filled with an operating medium, has a housing that preferably operates together in rotation with it, which contains the pump wheel at least partially and the turbine wheel also at least partially as observed in the axial direction and forms an intermediate space at least with the pump wheel and the turbine wheel. According to the invention it is provided that in order to connect operating space and intermediate space in the pump wheel, at least one opening is provided, which forms a channel through the pump wheel, which extends from the inner surface of the mounted blade part of the pump wheel to the outer circumference of the pump wheel and is oriented in such a way that the position can be described via at least one directional component, which is placed in the toroidal operating space tangentially on the contour of the operating and/or flow circulation occurring between the two blade wheels. The distance between the outer circumference of the pump wheel and the housing in the radial direction is designed in such a way that a rinsing current forms in the intermediate space and the operating medium is not washed down because of the centrifugal force. In other words, there is a spatially close arrangement. The concrete dimensioning, however, is a function of a series of factors, among other things, the rotational speed of the pump wheel.

The solution according to the invention makes it possible that in addition to the flow circulation in the toroidal operating space, for the purpose of force transfer, a partial flow of operating medium is branched off, which gets into the intermediate space directly and makes possible a rinsing effect for the deposits collected there or on the housing.

Preferably, the connection channel, i.e. the opening on the pump wheel, is constructed so that it is oriented tangentially in the direction of the circulation contour, i.e. in the direction of the flow that is becoming adjusted in the operating space during operation and is oriented in the flow direction. This makes it possible to generate the partial flow with the smallest possible resistances and flow speed losses and thus to obtain and optimal rinsing effect.

Preferably, a majority of connection channels, i.e. openings in the pump wheel, are provided. These can either be arranged either 1. on a common hypothetical theoretical circumferential line or, however,
2. on several different hypothetical circumferential lines on the pump wheel. Understood as the circumferential lines are the hypothetical theoretical lines on the outer circumference of the pump wheel, which run parallel to the hypothetical center plane between the pump blade wheel and the turbine blade wheel when the coupling is installed. There is the possibility to make the arrangement alternately on different circumferential lines.

The connection lines or openings on the pump blade wheel can, furthermore, be arranged on a circumferential line or several circumferential lines at 1. constant intervals or
2. different intervals between two adjacent openings.

The selection of the number and the arrangement on the different circumferential lines is at the discretion of the professional.

For the embodiment of the cross-section of the connection channels or openings, many possibilities are conceivable. For example, they can have a circular cross-section, oval embodiments or embodiments with cross-sections in the form of oblong holes.

The embodiment of the connection channel of the toroidal operating space at the outer circumference of the pump blade wheel can be made in many designs. Preferably, an embodiment that is directly oriented, in particular, tangential to the circulation contour in the operating space is provided. However, there is also the theoretical possibility to perform slight changes to a progression of this type. However, what leads to considerable damage of the partial flow, and thus to the impairment of its function, is avoided. Slight deviations from a straight-line progression in the connection channel are conceivable, however.

Furthermore, the connection channel between the toroidal operating space and the outer circumference of the pump wheel can be designed with 1. constant cross-section
2. variable cross-sections.

Cross-section changes to affect the partial flow are preferably made to gradually increase the flow speed.

The individual possibilities with regard to the cross-sectional embodiments of the connection channels or openings, whose arrangement on one or even many different circumferential lines on the pump wheel and/or the embodiment of the progression of the connection channel or the opening on the pump wheel from the toroidal operating space up to the outer circumference of the pump wheel can be combined in any desired manner with each other according to the intended effect. The concrete selection is done in this process preferably according the conditions of the usage case, especially the operating medium used.

The solution according to the invention can be used for many hydrodynamic couplings with different applied purposes. Embodiments are conceivable in which the housing of the hydrodynamic coupling is coupled either at least indirectly rotationally fixed with the primary blade wheel, i.e. the pump blade wheel or even the secondary blade wheel, i.e. the turbine blade wheel, i.e. the housing rotates in the operating condition, i.e. in hydrodynamic coupling of the pump wheel, together with the turbine wheel. This application case represents in the process a preferred application case, since in this arrangement a contact of one of the two blade wheels with a deposition on the housing is most likely to lead to damage, and furthermore, the occurrence of an imbalance is also avoided.

A preferred application of the solution according to the invention is made in a turbo compound system, in which the operating medium of the hydrodynamic coupling is made from the operating medium or oil of the internal combustion engine. Directly in these systems, problems often occur because of the deposits, which result from the suspended matter centrifuged out because of the fast rotating machine parts that the operating medium flows through.

The solution according to the invention for creating an operating circulation between pump blade wheel and turbine blade wheel with a partial flow that is used to rinse the intermediate space between the blade wheels and the housing, makes possible a solution to the problems of eliminating the deposits in the intermediate space between the housing and the outer circumferential surfaces of the individual blade wheels, which is simple and cost-effective in terms of manufacturing technology,

BRIEF DESCRIPTION OF THE DRAWINGS

The solution according to the invention is explained in the following using the Figures. The following is depicted:

FIG. 2a1 shows a first possible cross-section of the connection channel between the operating space and the outer circumference of the pump blade wheel;

FIG. 2a2 shows a second possible cross-section of the connection channel between the operating space and the outer circumference of the pump blade wheel;

FIG. 2b shows an embodiment example for a progression of the connection channel between the toroidal operating space and the outer circumference of the pump blade wheel with a varying cross-section over the length of the connection channel.

DETAILED DESCRIPTION OF THE INVENTION

Figure 1:
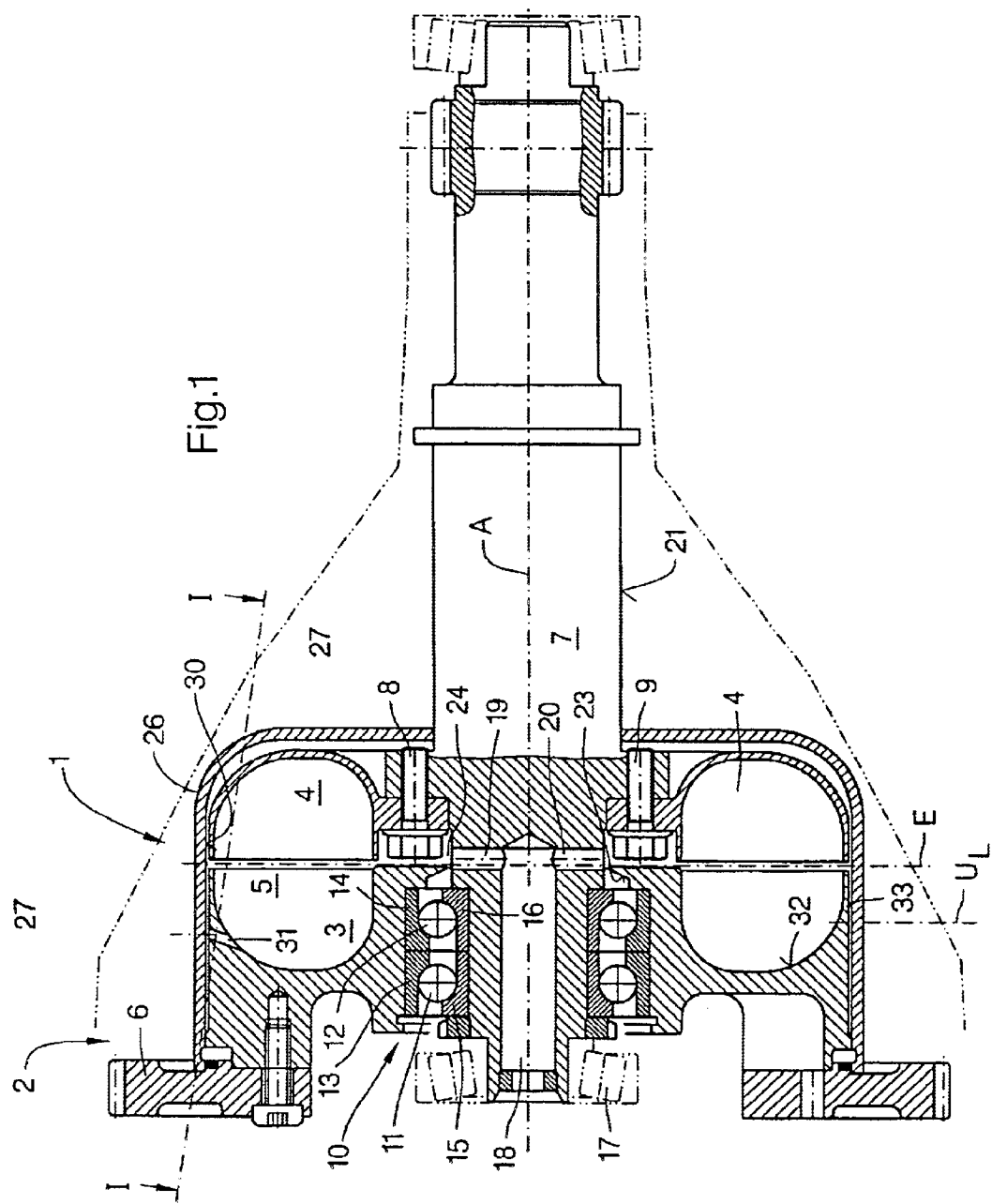
FIG. 1 shows, using an embodiment example in a turbocompound system, the embodiment according to the invention and operating method of the hydrodynamic coupling.

FIG. 1 shows, using the embodiment example in the form of a hydrodynamic coupling 1 in a turbo compound system 2, the solution according to the invention. The hydrodynamic coupling 1 includes a primary wheel 3, which is also characterized as a pump wheel, and a secondary wheel 4, which is characterized as a turbine wheel. Pump and turbine wheel 3 or 4 together form at least one toroidal operating space 5, which can be filled with an operating fluid, for example, with oil. The pump wheel 3 is driven by a gear arranged on a shaft, not shown here, of a drive turbine, not shown here. For this purpose, the gear meshes with a gear 6 coupled so that it is rotationally fixed to the pump wheel 3.

The turbine wheel 4 is arranged on a drive shaft 7 of the hydrodynamic coupling 1. In the embodiment example shown, the turbine wheel 4 is coupled to the drive shaft 7 so that it is rotationally fixed using non-positive and/or positive connections in the form of screw connections, here represented by the screw connections 8 and 9.

The pump wheel 3 is set in bearings at least indirectly on the driven shaft 7 via a bearing arrangement 10, which preferably contains two ball bearings 11 and 12. The ball bearings of the bearing arrangement 10 are designed as angular ball bearings. These make it possible to receive combined stresses, i.e. radial and axial forces, better than deep groove ball bearings. The pump wheel 3 is supported via the outer rings 13 or 14 of the angular ball bearings 11 or 12 and the inner rings 15 or 16 directly on the driven shaft 7. In order to create the torque reception on the pump wheel and in order to pass it on via the operating mechanism to the turbine wheel 4, the rotation is done by the pump wheel 3 and the outer rings 13 or 14 of the angular ball bearings 11 or 12 at the same rotational speed. Between the outer rings 13 or 14 and the pump wheel 3, press fits are provided for this purpose. The same applies for the support of the gear 6 via an additional bearing arrangement 17 on the driven shaft 7.

The supply of oil to the operating space 5 is done in the case represented directly via the driven shaft 7. For this purpose, the driven shaft 7 has a drill hole 18, which is preferably arranged coaxially to the symmetry axle A of the driven shaft 7. This drill hole extends from the primary side up to a certain extent to the plane E arranged through the middle vertical line through the toroidal operating space. From this central hole 18, additional distribution holes 19 or 20 branch off, which extend from the central bore hole 18 to the outer circumference 21 of the driven shaft 7 in the radial direction. Via the central bore hole 18 and the distribution bore holes 19 and 20, the operating fluid is conducted into the toroidal operating space 5. At the same time, a branching off of an operating medium current occurs for the bearing arrangement 10. For this purpose, a disc 22 is arranged between the pump wheel 3 and the turbine wheel 4, which has a beveled inner contour 23, which functions as a peeling edge for the operating medium. The beveled inner contour 23 runs in the process from a supply space 24 to the outer rings 13 or 14 of the angular ball bearings 11 or 12 of the bearing arrangement 10. The two angular ball bearings 11 or 12 are thus completely flooded. According to the design of the disc 22, the size of the operating medium current that is branched off can be affected. Thus only a central operating medium supply and thus also a lubricant supply is necessary. For a corresponding design, there is also the possibility here for additionally supplying the bearing 17, which functions for the support of the gear 6 on the driven shaft 7.

The hydrodynamic coupling 1 is enclosed by a bell-shaped housing 26. This housing is preferably designed as a deep-drawn part and is via various connection possibilities is preferably mounted indirectly to the gear. However, there is also the theoretical possibility, but here not depicted in detail, for coupling the housing either rotationally fixed to the pump wheel 3 or the to the turbine wheel 4, such that however, an intermediate space 27 is always formed between the pump wheel 3 and the housing 26. Because of the coupling between the housing 26 and the gear 6, the housing rotates together in the operation of the coupling or the drive of the pump wheel 3.

During the operation of the coupling, operating medium gets out of the toroidal operating space 5 into the intermediate space 27. The operating medium is thus no longer exposed to the circular and rinsing current between the blade mounting of the two blade wheels, pump wheel and turbine wheel, but instead is only exposed to the centrifugal force generated by the rotation of the coupling. Impurities in the operating medium are then centrifuged because of their high specific gravity against the inner wall 30 of the housing 26, where a danger of deposition at least always occurs, if on this inner side 30, unevennesses are provided in the form of projections, recesses or edges and/or it has an insufficient surface quality. This can lead to the contact of the secondary wheel 4 to the housing 26, such that a rigid coupling can result between the primary side and the secondary side. Furthermore, locational deposits can cause the formation on the surrounding housing of unbalanced masses, which result in bending vibrations. To solve this problem, openings 31 are provided in the pump wheel 3, for example, in the form of a connection channel between the blade base and the outer circumference of the blade wheel, which is constructed in such a way that its bearing can be described by at least one directional component in the flow direction in the operating state between pump wheel and turbine wheel as well as essentially tangentially to the contour of the flow progression that becomes set between the pump wheel and the turbine wheel, which allows the formation of a partial current from the operating space 5 to the intermediate space 27. The openings 31 extend in the process preferably from the inner surface of the blade mounted part, in particular from the blade base 32, to the outer circumference 33 of the pump wheel 3. The openings 31 are oriented in the process in such a way that at least one directional component is present to describe the position, which is oriented essentially tangentially to the contour of the operating mechanism circulation in the toroidal operating space 5 as seen in the operating condition. The direction of the tangential component, which can be used to describe the orientation of the opening 31, is thus always oriented in the direction of the current in the circulation in the toroidal operating space 5.

Preferably many openings are provided in the circumferential direction of the hydrodynamic coupling, in particular of the pump wheel 3, where they are arranged preferably at the same height and on a theoretical, hypothetical circumferential line UL on the circumference 33 of the pump wheel 3. The distances between the individual openings 31 are preferably selected to be constant.

The opening 31 has a constant cross-section in the case depicted from the blade base up to the outer circumference 33 of the pump wheel 3 and is designed in the form of a through-put bore. Every other possible cross-section is also conceivable. Furthermore, the possibility not shown in detail here, for providing the opening 31 with a varying cross-section over its extension from the blade wheel inner surface 31 of the pump wheel 3 to the outer circumference of the pump wheel 3 in order to affect the partial current flowing over it. Examples for the varying cross-sections are reproduced in FIG. 2a and examples for the possible cross-section changes are reproduced in FIG. 2b.

FIG. 2a shows possible cross-sections of the openings 31. The variation provided according to FIG. 2a1 in the form of through-put bore holes with circular cross-sections 31a with a diameter D represents a preferred variation that is simplest to create in manufacturing. Also conceivable, however, is a design according to FIG. 2a2 in the form of a longitudinal hole 31b. The cross-sections depicted are thus cross-sections as result when the section according to section I—I in FIG. 1 is made, i.e. made in a plane, which can be defined by the outer limits of the openings and is perpendicular to the running direction of the opening.

FIG. 2b shows an embodiment with a cross-section that is constantly narrowing to the outer circumference 33 of the pump wheel 3.

The embodiments according to FIGS. 1 and 2 represent only examples of the solution according to the invention. The concrete design or arrangement is done according to the requirements of the individual case and is at the discretion of the professional.

What is claimed is:

1. A hydrodynamic coupling, comprising:
    a pump blade wheel and a turbine blade wheel, which together form at least one toroidal operating space capable of receiving an operating medium;
    a bell-shaped housing containing said pump blade wheel at least partially in an axial direction, said housing, said pump blade wheel, and said turbine blade wheel forming an intermediate space between said housing and said pump blade wheel and between said housing and said turbine blade wheel;
    said pump blade wheel defining at least one connection channel between said toroidal operating space and said intermediate space, said connection channel having at least one directional component oriented essentially tangential to the contour of the circulation of said operating medium in an operating state between said pump blade wheel and said turbine blade wheel, such that a rinsing effect of the operating medium is achieved in the intermediate space, wherein said connection channel is oriented in the direction of the circulation contour of the flow circulation of the operating medium in said operating state between said pump blade wheel and said turbine blade wheel.

2. A hydrodynamic coupling according to claim 1, wherein said housing surrounds the coupling in said operating state.

3. A hydrodynamic coupling according to claim 2, wherein said housing is coupled at least indirectly to said pump blade wheel.

4. A hydrodynamic coupling according to claim 2, wherein said housing is coupled at least indirectly to said turbine blade wheel.

5. A hydrodynamic coupling according to claim 1, wherein said connection channel forms a straight line progression free of directional changes.

6. A hydrodynamic coupling according to claim 1, wherein said pump blade wheel defines a plurality of connection channels.

7. A hydrodynamic coupling according to claim 1, wherein said connection channel includes at least one cross-sectional change between said inner and outer circumference of said pump blade wheel.

8. A hydrodynamic coupling according to claim 7, wherein said connection channel is tapered in the direction of said outer circumference.

9. A hydrodynamic coupling according to claim 1, wherein the cross-section of said connection channel is circular.

10. A hydrodynamic coupling according to claim 1, wherein the cross-section of said connection channel is oval.

11. A hydrodynamic coupling, comprising:

a pump blade wheel and a turbine blade wheel, which together form at least one toroidal operating space capable of receiving an operating medium;

a bell-shaped housing containing said pump blade wheel at least partially in an axial direction, said housing, said pump blade wheel, and said turbine blade wheel forming an intermediate space between said housing and said pump blade wheel and between said housing and said turbine blade wheel;

said pump blade wheel defining at least one connection channel between said toroidal operating space and said intermediate space, said connection channel having at least one directional component oriented essentially tangential to the contour of the circulation of said operating medium in an operating state between said pump blade wheel and said turbine blade wheel, such that a rinsing effect of the operating medium is achieved in the intermediate space;

wherein said pump blade wheel defines a plurality of connection channels, and further wherein said connection channels are arranged on a theoretical, hypothetical circumferential line of said pump blade wheel, said circumferential line being parallel to a central plane between said pump blade wheel and said turbine blade wheel.

12. A hydrodynamic coupling, comprising:

a pump blade wheel and a turbine blade wheel, which together form at least one toroidal operating space capable of receiving an operating medium;

a bell-shaped housing containing said pump blade wheel at least partially in an axial direction, said housing, said pump blade wheel, and said turbine blade wheel forming an intermediate space between said housing and said pump blade wheel and between said housing and said turbine blade wheel;

said pump blade wheel defining at least one connection channel between said toroidal operating space and said intermediate space, said connection channel having at least one directional component oriented essentially tangential to the contour of the circulation of said operating medium in an operating state between said pump blade wheel and said turbine blade wheel, such that a rinsing effect of the operating medium is achieved in the intermediate space;

wherein said pump blade wheel defines a plurality of connection channels, and further wherein the distance between adjacent connection channels is constant.

13. A hydrodynamic coupling, comprising:

a pump blade wheel and a turbine blade wheel, which together form at least one toroidal operating space capable of receiving an operating medium;

a bell-shared housing containing said pump blade wheel at least partially in an axial direction, said housing, said pump blade wheel, and said turbine blade wheel forming an intermediate space between said housing and said pump blade wheel and between said housing and said turbine blade wheel;

said pump blade wheel defining at least one connection channel between said toroidal operating space and said intermediate space, said connection channel having at least one directional component oriented essentially tangential to the contour of the circulation of said operating medium in an operating state between said pump blade wheel and said turbine blade wheel, such that a rinsing effect of the operating medium is achieved in the intermediate space, wherein the cross-section of said connection channel is constant from an inner to an outer circumference of said pump blade wheel.

* * * * *

UNITED STATES PATENT AND TRADEMARK OFFICE
CERTIFICATE OF CORRECTION

PATENT NO. : 6,840,040 B1
DATED : January 11, 2005
INVENTOR(S) : Harald Hoffeld et al.

It is certified that error appears in the above-identified patent and that said Letters Patent is hereby corrected as shown below:

<u>Title page,</u>
Item [73], Assignee, change "Voith Tubro GmbH & Co. KG" to -- Voith Turbo GmbH & Co. KG --.

<u>Column 8,</u>
Line 37, delete "bell-shared" and insert -- bell-shaped --.

Signed and Sealed this

Fifth Day of July, 2005

JON W. DUDAS
*Director of the United States Patent and Trademark Office*